US009747567B2

(12) United States Patent
Convertino et al.

(10) Patent No.: US 9,747,567 B2
(45) Date of Patent: Aug. 29, 2017

(54) SELECTING ORGANIZATIONAL TRANSPORTATION PROPOSALS BASED ON COMMUTER PLEDGES AND COST-BENEFIT COMPUTATION

(71) Applicant: Conduent Business Services, LLC, Dallas, TX (US)

(72) Inventors: Gregorio Convertino, Martina Franca (IT); Jutta K. Willamowski, Grenoble (FR); Stefania Castellani, Meylan (FR); Maria Antonietta Grasso, Grenoble (FR)

(73) Assignee: Conduent Business Services, LLC, Dallas, TX (US)

( * ) Notice: Subject to any disclaimer, the term of this patent is extended or adjusted under 35 U.S.C. 154(b) by 694 days.

(21) Appl. No.: 14/153,481

(22) Filed: Jan. 13, 2014

(65) Prior Publication Data
US 2015/0199633 A1 Jul. 16, 2015

(51) Int. Cl.
G06Q 10/06 (2012.01)
(52) U.S. Cl.
CPC .............................. G06Q 10/06313 (2013.01)
(58) Field of Classification Search
CPC ......................... G06Q 10/06313; G06Q 10/00
USPC ........................................................ 705/7.23
See application file for complete search history.

(56) References Cited

U.S. PATENT DOCUMENTS 5,774,827 A * 6/1998 Smith, Jr. .......... G01C 21/3691
340/990
6,289,277 B1 * 9/2001 Feyereisen ........... G01C 21/005
340/945
6,961,756 B1   11/2005 Dilsaver et al.
6,981,055 B1 * 12/2005 Ahuja .................... H04L 45/04
370/401
7,546,206 B1 * 6/2009 Miller .................... G01C 21/00
701/120
8,214,136 B2 * 7/2012 Caillaud ................ G01C 23/00
244/175

(Continued)

OTHER PUBLICATIONS

Caliper.com Web Pages—TransCAD Caliper, Feb. 2013, Retrieved from Archive.org Sep. 9, 2016.*

(Continued)

Primary Examiner — Romain Jeanty
(74) Attorney, Agent, or Firm — Fay Sharpe LLP

(57) ABSTRACT

A method for planning a transportation service includes sending transportation proposal to a plurality of organizations. The proposal includes one or more initial options, each including a set of variable parameters. Each organization can generate a modified option and make a commitment conditional on selected ones of the parameters. Each organization sends respective modified options to commuters of that organization who may specify their own pledges for at least one of the modified options, conditional on the organization-selected values for the variable parameters and optionally on commuter-selected values for the variable parameters. A cost-benefit function is computed for each of a set of revised options for the transportation service, each of the revised options being based on a combination of the variable parameters for which pledges which cover the combination have been received and one or more of the revised options is identified, based on the computed cost-benefit function.

18 Claims, 10 Drawing Sheets

(56) References Cited

U.S. PATENT DOCUMENTS

| | | | |
|---|---|---|---|
| 8,280,769 B2 | 10/2012 | Walker et al. | |
| 8,788,367 B2 * | 7/2014 | Cormack | G06Q 30/02 705/26.63 |
| 8,818,351 B1 * | 8/2014 | Crossno | G06Q 10/08 370/241.1 |
| 9,400,779 B2 * | 7/2016 | Convertino | G06F 17/2785 |
| 2002/0095305 A1 * | 7/2002 | Gakidis | G06Q 10/10 705/300 |
| 2002/0107722 A1 | 8/2002 | Laurin et al. | |
| 2003/0036947 A1 * | 2/2003 | Smith, III | G06Q 10/10 705/300 |
| 2003/0100993 A1 * | 5/2003 | Kirshenbaum | G01C 21/26 701/408 |
| 2003/0187706 A1 * | 10/2003 | Buchmiller | G06Q 10/06 705/7.36 |
| 2004/0158483 A1 * | 8/2004 | Lecouturier | G06Q 10/08 705/6 |
| 2004/0162751 A1 * | 8/2004 | Tsyganskiy | G06Q 30/0203 705/7.32 |
| 2004/0186738 A1 * | 9/2004 | Reisman | G06Q 10/10 705/26.1 |
| 2005/0044135 A1 | 2/2005 | Klausnitzer | |
| 2006/0068840 A1 * | 3/2006 | Sherman | G06Q 10/06 701/1 |
| 2008/0027772 A1 * | 1/2008 | Gernega | G06Q 10/04 705/7.26 |
| 2008/0077309 A1 * | 3/2008 | Cobbold | G06Q 10/10 701/117 |
| 2008/0189148 A1 * | 8/2008 | Diaz | G06Q 10/02 705/6 |
| 2009/0005963 A1 * | 1/2009 | Jarvinen | G01C 21/3438 701/533 |
| 2009/0088973 A1 * | 4/2009 | Watkins | G01C 21/3691 701/469 |
| 2010/0280884 A1 * | 11/2010 | Levine | G01C 21/3438 705/13 |
| 2011/0093301 A1 * | 4/2011 | Walker | G06F 17/30867 705/5 |
| 2011/0093539 A1 * | 4/2011 | Laurin | G06Q 10/06 709/205 |
| 2011/0112759 A1 * | 5/2011 | Bast | G01C 21/3423 701/533 |
| 2011/0125794 A1 * | 5/2011 | Hutschemaekers | G08G 1/202 707/776 |
| 2012/0130727 A1 * | 5/2012 | Ahmed | G06Q 30/02 705/1.1 |
| 2013/0132284 A1 * | 5/2013 | Convertino | G06Q 10/103 705/300 |
| 2014/0082069 A1 * | 3/2014 | Varoglu | G06Q 50/01 709/204 |
| 2014/0214691 A1 * | 7/2014 | Morris, III | G06Q 10/101 705/300 |
| 2014/0229258 A1 * | 8/2014 | Seriani | G06Q 30/08 705/14.23 |

OTHER PUBLICATIONS

U.S. Appl. No. 13/911,534, filed Jun. 6, 2013, Sandor, et al.

U.S. Appl. No. 13/911,508, filed Jun. 6, 2013, Sandor, et al.

Roby, et al. "Workplace travel plans: past, present and future," J. Transport Geography 18, 23-30 (2010).

Ozenc, et al. "Adapt-a-ride: understanding the dynamics of commuting preferences through an experience design framework". In *Proceedings of the 2011 Conference on Designing Pleasurable Products and Interfaces* (DPPI '11). ACM, New York, NY, USA, Article 61, pp. 1-8 (2011).

Muller, et al. Crowdfunding inside the Enterprise: Employee-Initiatives for Innovation and Collaboration. In Proceedings of the SIGCHI Conference on Human Factors in Computing Systems (ACM CHI 2013), pp. 503-512 (2013).

Turrell, M., "Idea management and the suggestion box" Tech. rep., Imaginatik, pp. 1-8 (2002).

Westerski, et al. "Classifying and comparing community innovation in Idea Management Systems" Decision Support Systems 54(3): 1316-1326 (2013).

Kriplean, et al. "Supporting reflective public thought with Considerit" In Proc. of CSCW '12. ACM, pp. 265-274 (2012).

Kriplean, et al. "Is this what you meant?: promoting listening on the web with reflect" In Proc. of CHI '12. ACM, pp. 1559-1568 (2012).

Convertino, et al. "Large-Scale Idea Management and Deliberation Systems Workshop" In Proc. of the C&T 2013 Conf., pp. 1-4 (2013).

Davidson, et al. "European Experience of Travel Plans: an Expert Perspective" Proc. 12th WCTR, pp. 1-24 (2010).

Hurdle, D. "Encouraging Sustainable Commuting: A Guide for London's Local Authorities in Delivering Effective Travel Plans" Transport for London, pp. 1-80, (2007).

Belleflamme, et al. "Crowdfunding: Tapping the Right Crowd" International Conference of the French Finance Association (AFFI), Feb. 13, pp. 1-39 (2011).

"Feeling Congested" City of Toronto 2013, pp. 1-2, Retrieved from http://www.feelingcongested.ca/ on Sep. 16, 2013.

Jouret, G. "Inside Cisco's Search for the Next Big Idea" Harvard Business Review, pp. 1-3, Retrieved from http://hbr.org/2009/09/inside-ciscos-search-for-the-next-big-idea/ar/1 on Jun. 3, 2013.

* cited by examiner

A Web Page http://NewtownBusNetwork2014 ▼ | ▼ Search

Bus Line 1

| ItineraryA | ItineraryA | ItineraryA |

PledgeIF Rules

I pledge to buy:

<choose value> ▼

If:

○ rule 1 | <parameter> ▼ | <rel> ▼ | <value> ▼

○ rule 1 | <parameter> ▼ | <rel> ▼ | <value> ▼

Comment (optional): I did not pledge because the parameter "Number of Transfer" was not available but is important for me Employee Subsidy <amount>

Submit Comment Only | Pledge

Bus Line 2
Bus Line 3
Bus Line 4

FIG. 7

SELECTING ORGANIZATIONAL TRANSPORTATION PROPOSALS BASED ON COMMUTER PLEDGES AND COST-BENEFIT COMPUTATION

BACKGROUND

The exemplary embodiment relates to public transportation planning and finds particular application in connection with a system and method for identifying support for a transportation service in advance of its introduction.

Planning and managing of public transportation networks are typically complex processes, especially when a transport provider, such as a city, has to make decisions about new transportation services or changing existing ones. For example, the city may be considering introducing new bus lines or modifying existing ones. As part of the planning, the city would like to understand the key parameters that will affect how the local population will respond to the changes to the transportation network.

There are problems, however, in that the transport provider often lacks information which would help it to understand what would be the consequences of potential modifications of public transportation services (e.g., bus lines). For example, it would be helpful to know whether sufficient commuters will make use of the proposed service to make it financially viable and also whether the use of existing services will be impacted. At the same time, the local government would also like to support organizations in the region and to meet the transportation needs of those organizations, where feasible. While some information can be collected from existing commuters by conducting surveys at various locations in the transportation network, these can be time consuming and do not reach individuals currently not using public transport, who may be interested in using a new or modified service that was convenient for them.

Another problem is that commuters and the organizations to which they commute would often like to have some influence in the planning decisions, based on their needs. While surveys may be used to predict the impact of transportation service modifications, they are often used to collect and aggregate feedback on modifications which have already been implemented. Even when they are used to collect preliminary interest from a sampled population, the responses do not indicate the level of commitment of the respondents to the survey. The organizations also lack influence on the planning of the transportation network such that modifications are made which would help them to become more attractive to employees and clients.

There remains a need for a system and method which enables the different actors impacted by transportation modifications to participate in the planning of such modifications in a way which allows the transport provider to have confidence that the modification will be advantageous.

INCORPORATION BY REFERENCE

The following references, the disclosures of which are incorporated herein in their entireties by reference are mentioned:

U.S. Pat. No. 6,961,756, issued Nov. 1, 2005, entitled INNOVATION MANAGEMENT NETWORK, by Evelyn Dilsaver, et al.

U.S. Pat. No. 8,280,769, issued Oct. 2, 2012, entitled METHOD AND APPARATUS FOR ADMINISTERING A REWARD PROGRAM, by Jay S Walker, at al.

U.S. application Ser. No. 13/300,467, filed Nov. 18, 2011, entitled SYSTEM AND METHOD FOR MANAGEMENT AND DELIBERATION OF IDEA GROUPS, by Gregorio Convertino, et al.

U.S. Pub. No. 20030036947, published Feb. 20, 2003, entitled SYSTEMS AND METHODS FOR SUBMISSION, DEVELOPMENT AND EVALUATION OF IDEAS IN AN ORGANIZATION, by William E. Smith, Ill., et al.

U.S. Pub. No. 20050044135, published Feb. 24, 2005, entitled METHOD FOR MANAGING AND PROVIDING AN IDEA MANAGEMENT SYSTEM, by Norbert Klausnitzer.

U.S. Pub. No. 20110093539, published Apr. 21, 2011, entitled SYSTEM AND METHOD FOR INNOVATION AND IDEA MANAGEMENT, by Andre Laurin, et al.

U.S. Pub. No. 20020107722, published Aug. 8, 2002, entitled IDEA MANAGEMENT, by Andre Laurin, et al.

U.S. patent application Ser. No. 13/911,534, filed Jun. 6, 2013, entitled METHOD AND SYSTEM FOR CLASSIFYING REVIEWERS' COMMENTS AND RECOMMENDING RELATED ACTIONS IN IDEA-GENERATING SOCIAL MEDIA PLATFORMS, by Agnes Sandor, et al.

U.S. patent application Ser. No. 13/911,508, filed Jun. 6, 2013, entitled METHOD AND SYSTEM FOR IDEA SPOTTING IN IDEA-GENERATING SOCIAL MEDIA PLATFORMS, by Agnes Sandor, et al.

BRIEF DESCRIPTION

In accordance with one aspect of the exemplary embodiment, a method for adaptive planning of a transportation service includes sending a transportation proposal to a set of organizations, the proposal including a set of initial options, each initial option including a set of variable parameters for specifying a transportation service. The method further includes providing for each organization to select values for one or more of the variable parameters to generate at least one modified option, and for making a commitment for the modified options, conditional on the organization-selected values for the variable parameters and providing for each organization to send respective modified options to commuters of that organization. Responses to the modified transportation proposal are received, at least some of the responses including pledges by the commuters for at least one of the modified options based on the organization-selected values for the variable parameters and optionally on commuter-selected values for the variable parameters. A cost-benefit function is computed for each of a set of revised options for the transportation service, each of the revised options being based on a combination of the variable parameters for which pledges which cover the combination have been received At least one of the revised options is output, based on the cost-benefit function.

One or more of the steps of the method may be implemented by a computer processor.

In another aspect of the exemplary embodiment, a system for adaptive planning of a transportation service includes a cost estimator for estimating a cost for each of an initial set of options, each initial option including a set of variable parameters for specifying a transportation service. A parameter component stores selectable parameters associated with each initial option, and values of the selectable parameters selected by organizations in generating modified options. A user interface generator generates at least one of: a first user interface for organizations to make a commitment for at least one of the modified options, based on the organization-selected values for the variable parameters, and a second user interface for commuters of the organizations to make a commitment for at least one of the modified options, based on the organization-selected values and optionally on one or more user-specified values for the variable parameters. A pledge processing component aggregates responses to the modified transportation proposal received from the organizations, at least some of the responses including pledges by the commuters for at least one of the modified options based on the organization-selected values for the variable parameters and optionally on commuter-selected values for the variable parameters. A cost-benefit computation component computes a cost-benefit function for each of a set of revised options for the transportation service, each of the revised options being based on a combination of the variable parameters. An option update component identifies at least one of the revised options based on the computed cost-benefit function. A processor implements the cost estimator, parameter component, user interface generator, pledge processing component, cost-benefit computation component, and option update component.

In another aspect of the exemplary embodiment, a method for adaptive planning of a transportation service includes sending a transportation proposal to a plurality of organizations, the proposal including a set of variable parameters for specifying an option for a transportation service. A first graphical user interface is provided for each of the organizations to pledge a number of tickets for the transportation service and to select conditions for the organization's pledge, based on selected values for one or more of the variable parameters. A second graphical user interface is provided for commuters of each organization to pledge to purchase a ticket for the transportation service and to select conditions for the commuter's pledge, based on selected values for one or more of the variable parameters, the conditions for the commuter's pledge being constrained by the conditions for the organization's pledge. The pledges made by the organizations and the commuters are received and a cost-benefit function is computed for each of a set of combinations of the selectable parameters for the transportation service, the cost-benefit function taking into account those of the organization pledges and commuter pledges which cover the respective combination. Provision is made for identifying an option for the transportation service based on the computed cost-benefit function for one of the combinations.

BRIEF DESCRIPTION OF THE DRAWINGS

FIG. 7 is a screenshot illustrating the graphical user interface of FIG. 4, completed to illustrate a comment submitted without a pledge;

FIG. 9, which is split for convenience into

DETAILED DESCRIPTION

Figure 1:
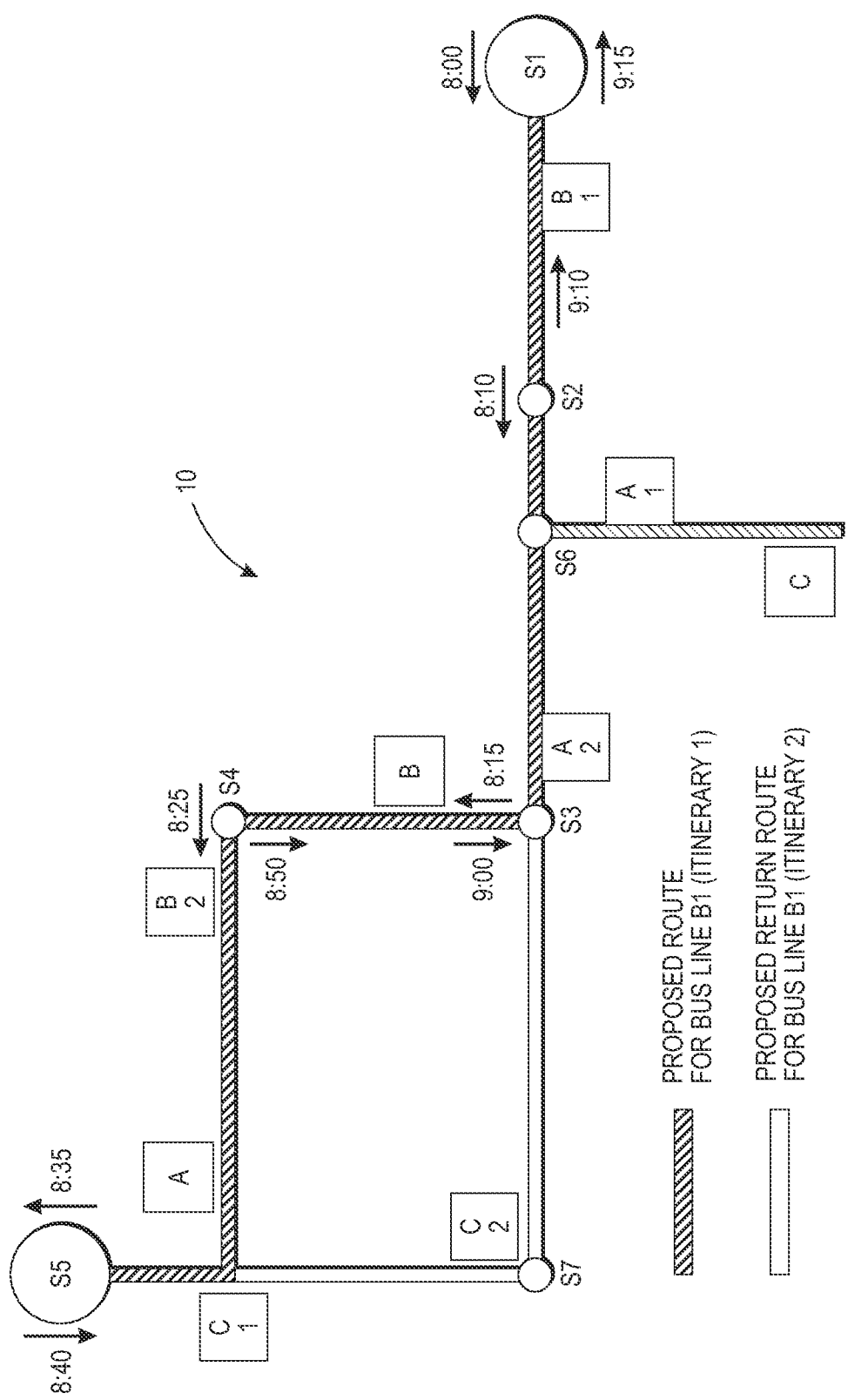
FIG. 1 illustrates an example route for one proposal for a public transportation service.

The exemplary embodiment is directed to a system and method for assisting a transport provider to plan a transportation service which involves organizations and commuters in the planning decision as well as the transportation service.

By way of introduction, in an ideal world, suppose that a city U (Urbis), or its transport provider, is planning to introduce a new bus line that could serve commuters of organizations A, B, C. A set of alternative options are defined by the city for the new bus line. In the hypothetical case where information is known in advance, it is possible to compute which route should be chosen. To simplify the illustration, it is assumed that the organizations are equidistant on a graph U--A--B--C. For each alternative option, there is a start-up cost $c_0$, and a cost $c$ for every link created, such as A-B (and back) or B-C (and back). Moreover, a finite horizon can be considered, over which the city will amortize the start-up costs and therefore will assume daily operating costs for the bus lines of different lengths have the following forms:

$$C_A = c_0 + c$$

$$C_B = c_0 + 2c$$

$$C_C = c_0 + 3c.$$

The introduction of the bus will make it more appealing for people to work in the organizations A, B, C while living in the city. So it may be expected that the organizations gain a benefit for accessibility, ease of recruitment, and image. This benefit can be estimated based on business output of the organization.

There is also a quantifiable benefit for the groups of commuters $D_A$, $D_B$, $D_C$ of the organizations A, B, C, respectively. This benefit can be estimated in terms of the current traveling costs (e.g., gas, parking, time spent driving) and the value added to their working life by the new line (i.e., how much the commuter is willing to pay for this new value added). So if a bus line is built and connects organization X then there will be a daily benefit for the city of $D_X r_U$ from current commuters taking the bus instead of a car. There might also be an additional benefit to the city of $D_X^+ r_U$ from the additional citizens in U that may use this line. Finally, a portion of the benefits to the city, here quantified as $D_X^- r_U$, are deducted because of the reduction of benefits that the new bus line causes to the existing bus lines in the city (i.e., less users for those lines). In summary, Urbis's daily benefit (udb) from connecting a particular organization X (one of A, B, and C) via the new bus line can be computed as:

$$UDB_U^X = (D_X + D_X^+ - D_X^-) r_U \quad (1)$$

The commuter's daily benefit (cdb) of using a bus instead of a car to and from X is $cdb_X$ so the benefits to all the commuters of organization X for connecting X to the city U via the new bus line is:

$$CDB_X = (D_X + D_X^+ - D_X^-) cdb_X \quad (2)$$

The organization's daily benefit (odb) for organization X to be connected is:

$$ODB_X = D_X r_X. \quad (3)$$

The city needs to choose among the set of alternative options for the new bus line. Thus, if demands and needs of the citizens and organizations are known, then the decision for the city on which bus line to introduce entails selecting the option that maximizes the total benefit:

$$L^*(\text{new line option}) = \quad (4)$$
$$\operatorname{argmax}\{0, -(c_0 + c) + UDB_U^A + CDB_A + ODB_A -$$
$$(c_0 + 2c) + \sum_{X \in \{A,B\}} UDB_U^X + CDB_X + ODB_X,$$
$$-(c_0 + 3c) + \sum_{X \in \{A,B,C\}} UDB_U^X + CDB_X + ODB_X\}.$$

The commuters would pay $cdb_X$ per day, the organization would subsidize $ODB_X$ per day, the city pays $-(c_0+L^*c)+UDB^*_U$ per day and reaps any surplus. Note also that L* (new line option) customizes the start-up and operating costs based on the properties of the new line option, which are defined a priori by the city, when defining the alternative options.

The three benefit estimates $UDB_U^X$, $CDB_X$, $ODB_X$ can also be expressed in terms of a full year by multiplying them by the number of working days in a year, thus yielding $UYB_U^X$, $CYB_X$, $OYB_X$ (Urbis/Commuter/Organization Yearly Benefit).

However, this hypothetical illustrates the problem that is faced by the transport provider, since several of the parameters in the L* function are currently unknown. In particular, $CDB_X$ and $ODB_X$ are unknown: how much commuters and organizations would actually benefit from each new line option and under what circumstances they would commit to using it.

In one embodiment, a solution is to provide a method and system for a public transport provider, such as a city, to obtain an indication of this information from the commuters and their organizations and then leverage it to plan which new bus lines to offer. The exemplary system and method support decision-making processes for the management of public transportation (e.g., bus lines) using an approach that, considering work organizations as channels to reach the corresponding workforce, facilitates reaching a critical mass of interest in a planned transportation service by allowing:

a) the local government or other transport provider to learn the key parameters for work organizations and commuters and build a cost-benefit function to decide what modifications are worth implementing based on the expected uptake;

b) each organization to make commitments, such as a pledge to purchase tickets or to provide its employees with a subsidy, and to specify its own conditions; and c) the commuters associated with these organizations to pledge and specify their own conditions.

An embodiment of a multi-level decision-making system and method is illustrated by way of example. In the example, the method and system enables adaptive planning of bus lines in a city.

The following terms are used herein:

Critical mass: a threshold value of the number of users of a transportation service, such as a new bus line, at which the payments of the users pays for the start-up and daily operating costs incurred by the transport provider (e.g., the city) for the new line. The threshold can also be fixed at a lower value, if the transport provider is willing to subsidize the new line (considering the benefits resulting from the modal switch of the citizens in terms of less congestion, for example).

Levels (or actors): the supported process involves three levels (or actors) the transport provider (e.g., local government), the population of commuters, and the organization(s) where these commuters work.

Option: modification proposed by the transport provider to a public transportation network, e.g., a proposed new bus line, which can be further specified by conditions expressed by organizations and/or commuters.

Pledge: resources invested by an actor in a specific option (e.g., a number of tickets or passes the actor commits to buy for a given period if the option is implemented). A maximum price for these tickets or passes may be initially defined as a basis by the transport provider and proposed to the pledging actors. A pledge may entail a commitment on behalf of the respective organization that the organization employees as a whole will meet a certain usage level, e.g., that at least a predetermined number of passes for the route will be purchased by the organization (and/or its employees) for the coming year or other predetermined time period, e.g., for a given price. The pledge may be for a proposed option or for a modified option, e.g., providing modifications to the route, schedule, price, or the other parameter specified in the option. Or the actor may propose new parameter(s). The pledges from the organizations need not be legally binding, since the transport provider is likely to plan additional routes in the future and an organization which does not meet its commitment one year can expect for its future pledges to carry less weight when a new route or modifications to an existing route is being planned. Also, an organization may decline to respond to the proposed option(s) if it chooses to do so.

Parameter: an actor-specified criterion regulating the pledge (e.g., bus frequency, distance from actor to nearest stop, or the like).

Pledge-If rule: an actor-specified rule that associates a pledge to conditions expressed in terms of a set of parameters (e.g., a pledge for 2 yearly passes for introducing the bus line OPTION# IF bus_frequency>VALUE).

Sustainable Commuting Club: inter-organization association whose members, both organizations and commuters, benefit from special discounts on public transportation. The membership may be acquired by participating in the pledging process and may be renewed by regularly participating in pledging processes. Similar associations exist in cities, such as London, UK, and Grenoble, France. These existing clubs use travel plans (see, Davison, et al. "European Experience of Travel Plans: an Expert Perspective," Proc. 12th WCTR (2010), and Roby, et al. "Workplace travel plans: past, present and future," J. Transport Geography 18, 23-30 (2010)) as policy-based incentives for organizations and commuters to participate and propose a general reduced pass to all their members (see, e.g., David Hurdle, "Encouraging Sustainable Commuting: A Guide for London's Local Authorities in Delivering Effective Travel Plans," Publisher, Transport for London (2007); and "Plan de Deplacement d'Enterprise (PDE-PDA): Observatoire 2009 des PDE-PDA dans la région urbaine grenobloise," Publisher, Chambre de Commerce et d'Industrie de Grenoble (2009)).

With reference to FIG. 1, an illustration of a map 10 detailing a proposal for development of a new public transportation service, such as a bus, train, or tram line, in a transportation network is shown by way of example. The illustrated proposal for the proposed transportation service involves a route (Itinerary 1) which starts at S1 and ends at S5, stopping at stops S2, S3, and S4 along the way, and returning along the same route, stopping at stops S4, S3, and S2 ending at S1. A timetable with schedules for the stops is also proposed, a first schedule is for a bus leaving S1 at 8:00 am and reaching S5 at 8:35 am, waiting a few minutes, then returning to S1 at 9.15. The proposal is to repeat the schedule at 9:00, 16:00 and 17:00. There may be a number of proposed options within a transportation proposal, or they may be developed later, based on initial feedback from the organizations.

Three organizations A, B and C are located on or near the proposed route, whose employees could take advantage of the route and also potentially make it easier for the organizations to retain and hire new employees since the organizations are not currently well served with transportation routes. The locations of some of the organizations' employees (or other commuters to these organizations, which may be included in the map (or only shown to specific users, such as their own organization), are shown by way of example: A1, A2 for organization A, B1, B2 for organization B, and C1 and C2 for organization C. As will be appreciated, in reality, there may be many more organizations and/or commuters associated with the organizations.

The method provides a simple and direct way for commuters and the organizations with which they are associated to prioritize the options and at the same time inform the transport provider about their needs. In one embodiment, the transport provider launches the process. The proposal is sent by the transport provider to the three organizations requesting pledges for one or more different options for the new bus line.

In another embodiment the process could be launched by an organization, e.g. because a periodic survey within this organization has revealed the need for changes in the bus lines nearby the organization's site location.

In the exemplary embodiment, only new lines are considered. It will be appreciated that the case of modifications to existing lines can also be considered. Additionally, the effect on existing lines may be considered (as when the new line heavily interferes with the existing lines, see $-D_x^- r_U$ in the formulas above). In such a case, organizations and commuters may be requested to express their preferences.

Figure 2:
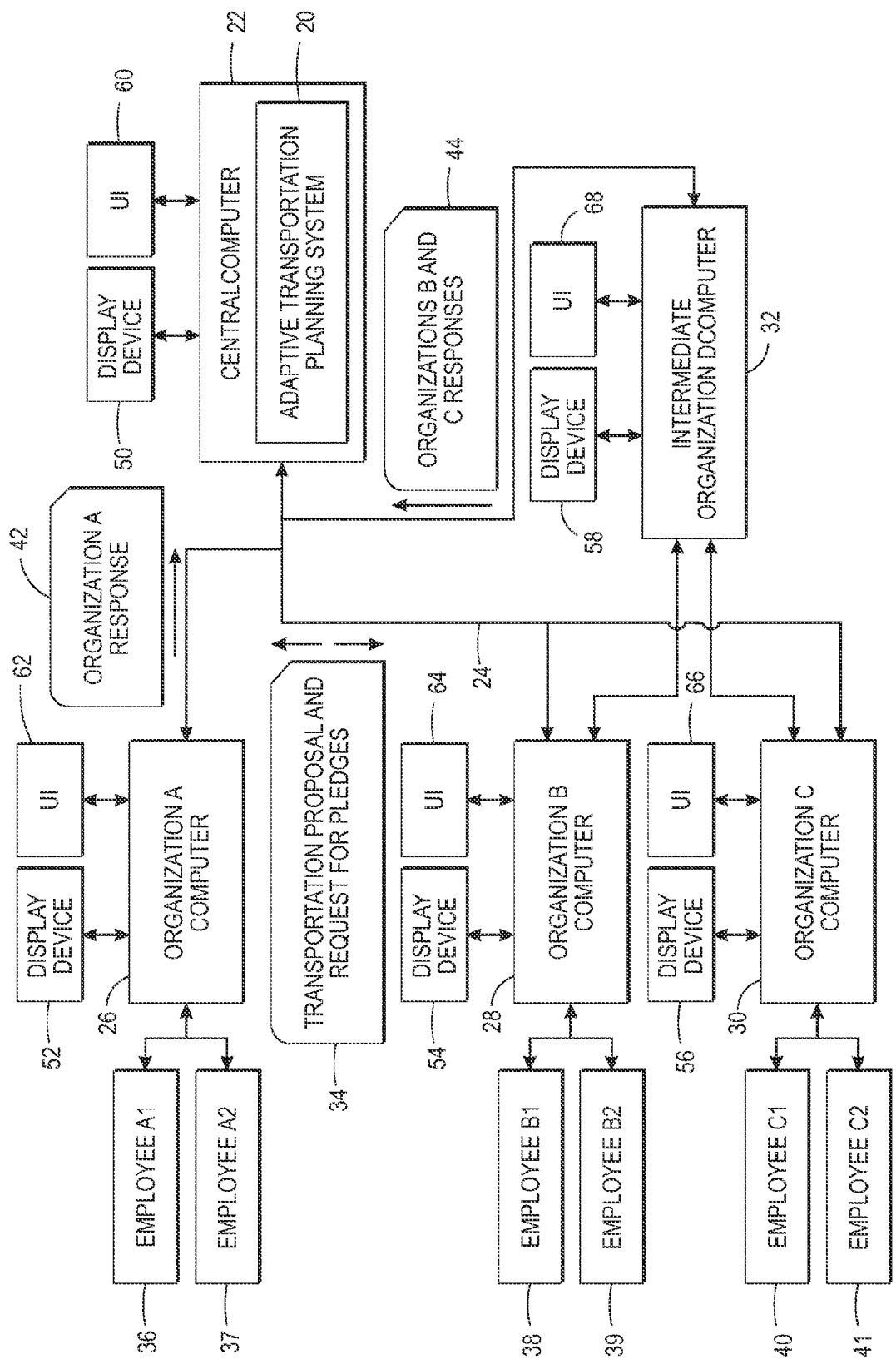
FIG. 2 is a functional block diagram of an environment in which a system for adaptive planning in a transportation network operates.

An exemplary environment in which an adaptive transportation planning system 20 operates is shown in FIG. 2. The system is hosted by a central computer 22, which communicates, via a network 24, with computing devices 26, 28, 30 of organizations A, B, and C, respectively (and/or with a computer 32 of an intermediate organization D, which acts on behalf of two or more of the organizations). The transportation planning system 20 outputs a transportation proposal 34, including one or more initial options, which is sent via the network to the organizations A, B, and C and received by computers 26, 28, 30. The organizations refine the proposal through interaction with employees via their personal computers 36, 37, 38, 39, 40, 41. The organizations A, B, and C, or intermediate organization D, return their respective responses 42, 44 to the transport provider, e.g., to central computer 22, which may include pledges. The transport provider may further refine the proposal 34 for another round of review by the organizations and their employees.

Each computer 22, 26, 28, 30, 3236, 37, 38, 39, 40, 41 may be associated with a respective display device 50, 52, 54, 56, 58, etc., such as an LCD screen, computer monitor, or the like, and a respective user input device (UI) 60, 62, 64, 66, 68, etc., such as a touch screen, keyboard, keypad, cursor control device, or combination thereof.

Figure 3:
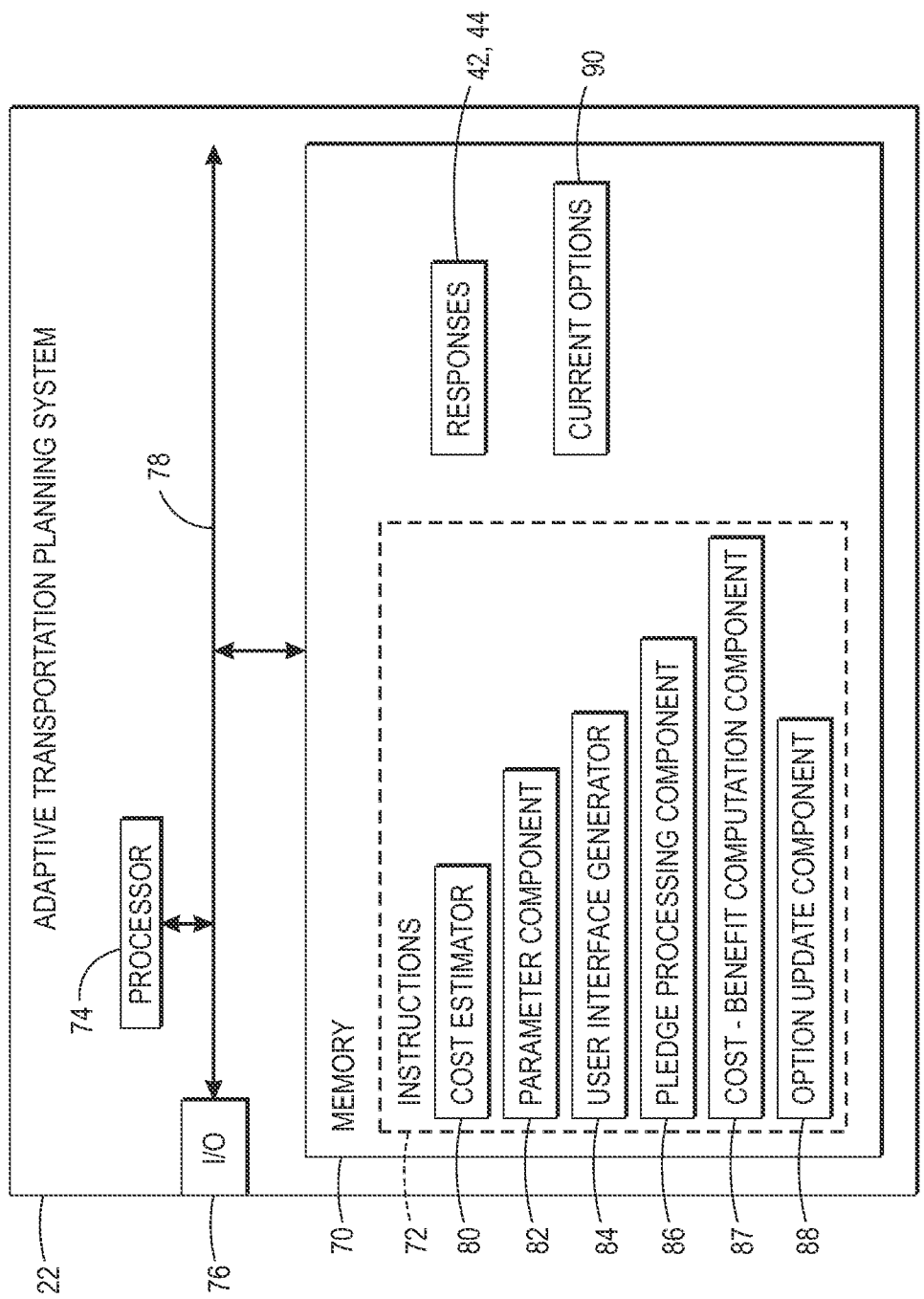
FIG. 3 illustrates components of the adaptive transportation planning system of FIG. 2.

As shown in FIG. 3, the central computer 22 may include non-transitory memory 70 which stores instructions 72 for performing parts of the method implemented by the transportation planning system 20 and a processor 74, in communication with the memory for executing the instructions. A network interface 76 allows the central computer 22 to communicate with external devices via the network 24. Hardware components of the computer 22 are communicatively connected with a data/control bus 78.

The exemplary instructions 72 include a cost estimator 80, a parameter component 82, a user interface generator 84, a pledge processing component 86, a pledge processing component 86, a cost-benefit computation component 87, and an option update component 88.

The cost estimator 80 estimates the annualized or daily cost of providing each of the initial options and an optionally subsidized ticket price for meeting the cost, based on an estimated quantity of tickets to be sold, using a cost-benefit function.

The parameter component 82 stores selectable parameters associated with each option, such as bus frequency, distance to stop, etc., and stores values for these parameters which have been submitted by an organization in connection with a pledge.

The user interface generator 84 generates a graphical user interface for display on a display device 52, 54, 56, etc., which is based on the current set of selectable parameters. Example screenshots of graphical user interfaces (GUI) 92, 130 are illustrated in FIGS. 4-7, and described in further detail below. For example, the user interface generator 84 provides a first graphical user interface 92 for each of the organizations to select to pledge a number of tickets for a proposed transportation service and to select conditions for the organization's pledge, based on selected values for one or more of the variable parameters. The user interface generator 84 also provides a second graphical user interface 130 for commuters of each organization to pledge to purchase a ticket for that transportation service and to select conditions for the respective commuter's pledge, based on selected values for one or more of the variable parameters, the conditions for the commuter's pledge being limited by the conditions set for the respective organization's pledge.

The pledge processing component 86 processes the incoming responses 42, 44 to identify values of the parameters associated with each pledge and any additional parameters proposed in a response 42, 44.

The cost-benefit computation component 87 computes a cost-benefit function for each of a set of revised options for the transportation service, each of the revised options being based on a combination of the variable parameters, generated based on the organizations/commuters responses and, in particular, the parameters of the pledging responses 42, 44. The cost-benefit computation component 87 evaluate whether a critical mass has been reached for any of the revised options. The revised options are ranked based on the computed cost-benefit function an optionally on other factors.

The option update component 88 identifies a subset of the revised options 90 that are most highly ranked and outputs them for review by the transportation provider.

As will be appreciated, some of these functions may be performed partially manually, and the system components may rely on operator inputs via a GUI displayed on the display device 50.

Other computers 26, 28, 30, 32 which communicate with the central computer may each be similarly configured with memory and a processor. As will be appreciated, the exemplary architecture shown in FIGS. 2 and 3 is simply one possible architecture for implementing the method and that parts of the method described below may be performed manually.

Figure 4:
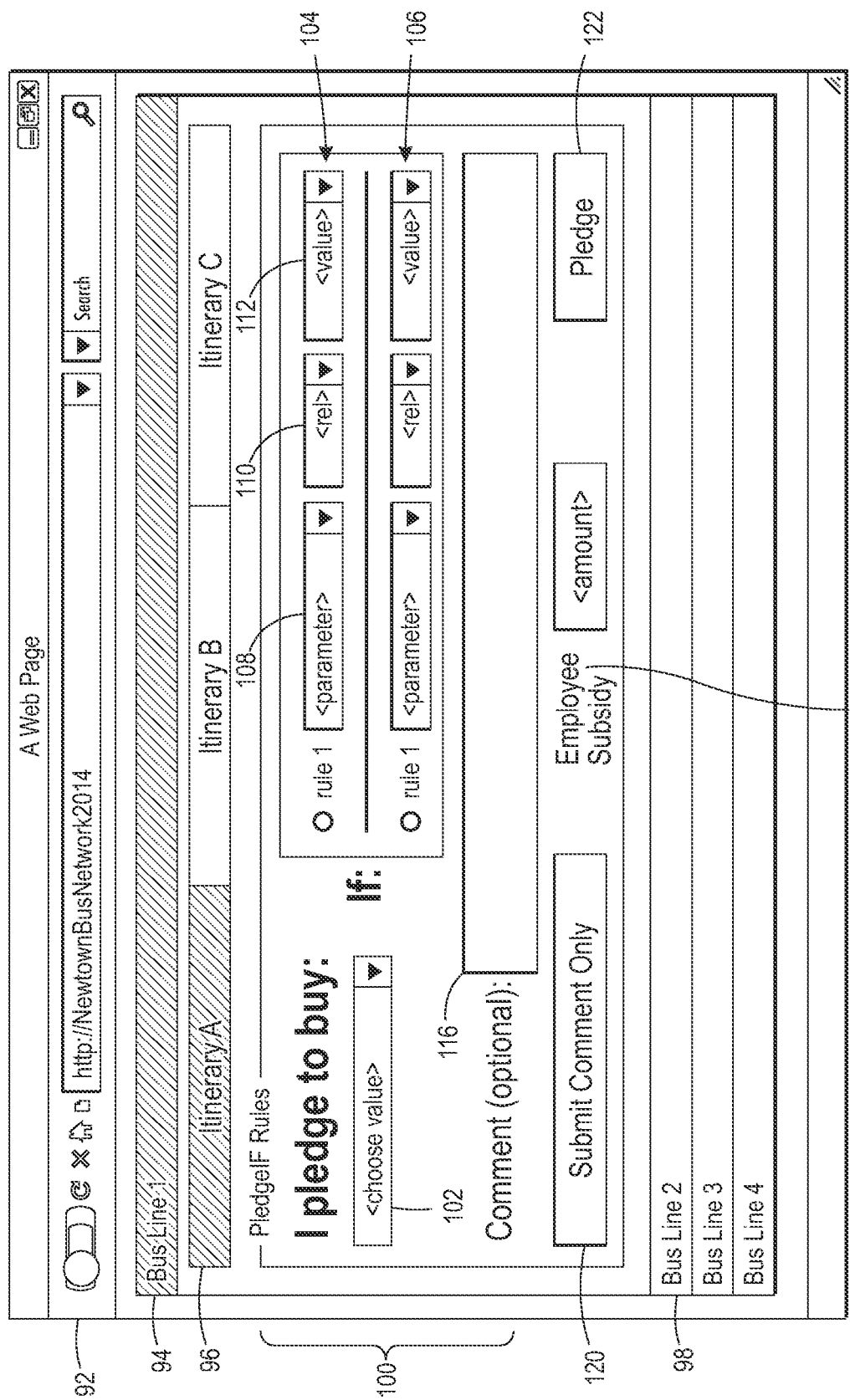
FIG. 4 is a screenshot illustrating a graphical user interface for submitting pledges for proposed options for public transportation services.

The exemplary GUI 92 illustrated in FIG. 4 includes proposals for one or more bus lines (bus lines 1, 2, 3, and 4). Currently, information for a first itinerary (itinerary A) for bus line 1 is displayed. By clicking on tabs such as tabs 94, 96, 98, etc., a user can review the proposed route and schedule for each bus line and its itinerary.

Figure 5:
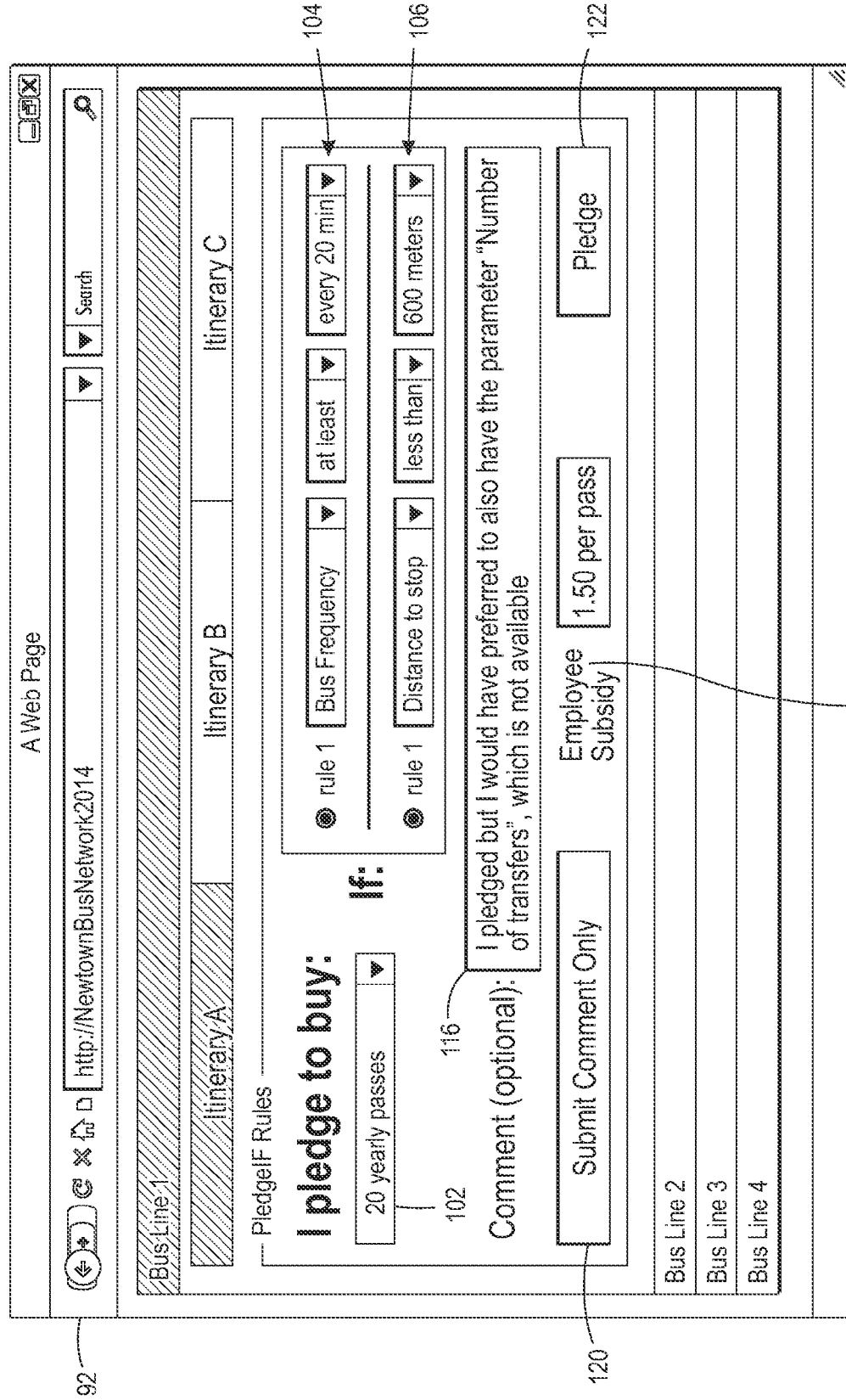
FIG. 5 is a screenshot illustrating the graphical user interface of FIG. 4, completed to illustrate a pledge.
Figure 6:
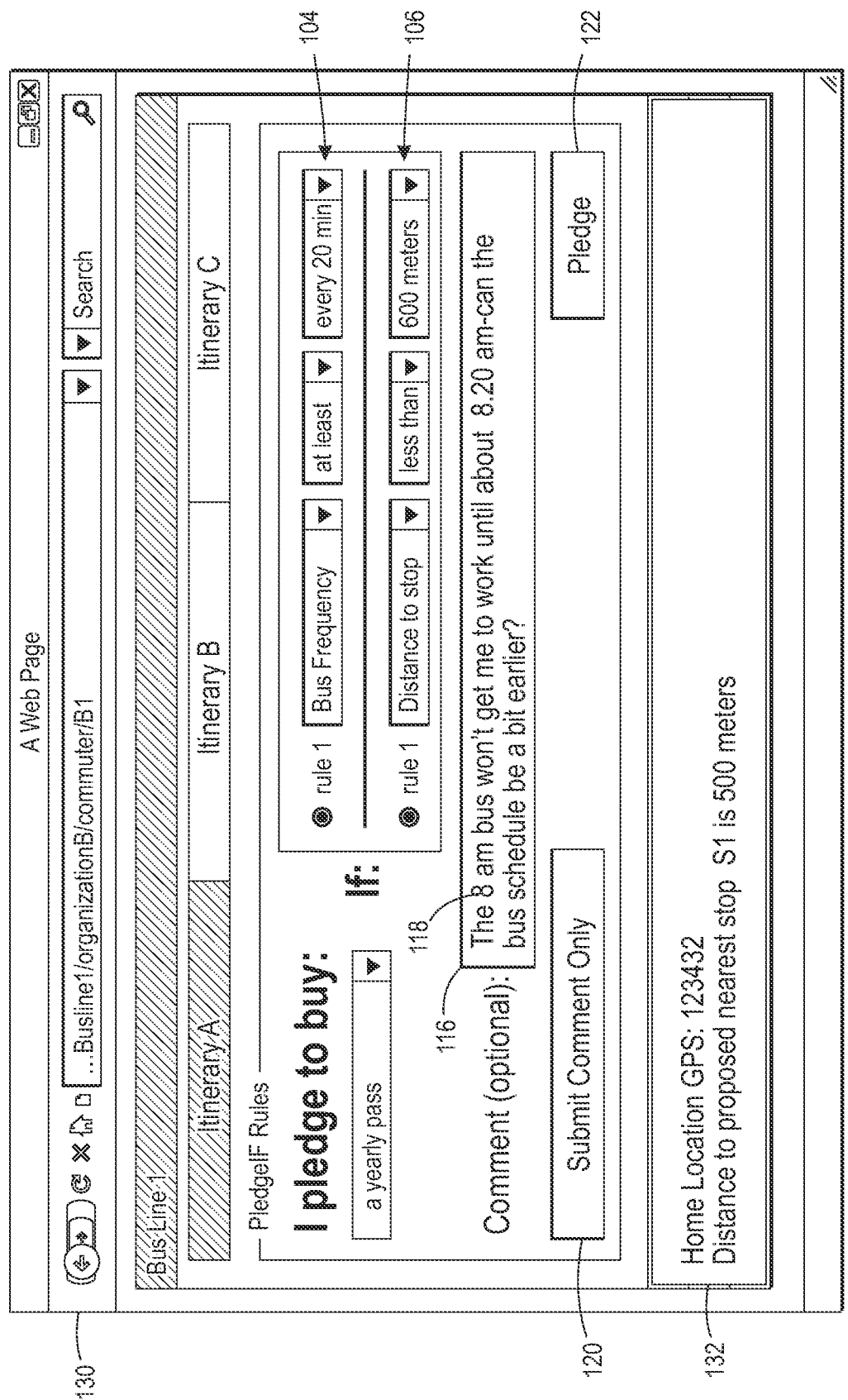
FIG. 6 is a screenshot illustrating a graphical user interface configured for an employee, completed to illustrate a pledge.

A pledging region 100 of the interface includes a pledge value selector 102 which allows a user to specify a quantity of passes that the organization agrees to buy if certain conditions are met. These conditions are expressed in the form of pledge rules 104, 106, etc., in which the user can select values of the predefined parameters to create the rules, e.g., by clicking on parameter selectors 108, 110, 112, such as drop down menus. The user may be limited to a specified maximum number of rules. FIG. 5 illustrates an example response 42 created through the GUI of FIG. 4, including example rules 104, 106 that a user has generated in connection with a pledge value of 200 passes. The user, if an organization, may also be permitted to indicate a subsidy that the user is willing to provide as an incentive to its employees to purchase the passes, e.g., through a subsidy selector 114.

The GUI 92 also includes a comments box 116 in which the user can enter free text 118 which can assist the transport provider in evaluating whether the proposal should be refined, e.g., to add more selectable parameters, which could result in an improved pledge for a given option.

When the user is satisfied with the response, the user can opt to submit comments (without a pledge) by clicking on a "submit comment only" icon 120, or submit a pledge, optionally with a comment, using a pledge icon 122. In FIG. 5, the organization has specified the pledging conditioned upon two PledgeIF rules and added a comment. The user submits the information using the "Pledge" button 122.

A similar GUI 130 (FIG. 6) can be provided to the commuters by the organization. The organization may have filtered out proposals which are not relevant and already specified some constraints prior to providing the interface to the commuters, thus limiting the options (combinations of parameters) available for selection. The commuter may identify the location of their home through the GUI, allowing relevant information to be displayed at S132. The commuter may specify similar rules to the organization, such as rules concerning bus frequency, distance to stop, through selection of the remaining variable parameter values, and may also provide comments. In the case where a user submits a comment only, such as shown in FIG. 7, the system (or organization) receives that information. In that case, the user does not specify any rule but submits a comment using the "Submit Comment Only" button 120.

The system 20 allows the different users (i.e., the transport provider, organization, individual employees respectively) to specify the geographic locations that are relevant to them. For example for the organization these locations will be the location(s) of the organization itself, the employees home locations, and any other location relevant to the organization (such as transportation hubs, etc.). Each actor may create, store, and access these locations for the recurring calls for pledges. The graphical user interface visualizes the proposed routes on the map 10 (FIG. 1), together with those location(s). The transportation service provider then uses the web-based tool 92, 130 to collect information from organizations and users.

The computer-implemented system 20 may include one or more computing devices, such as a server computer, desktop, laptop, tablet, or palmtop computer, portable digital assistant (PDA), cellular telephone, pager, combination thereof, or other computing device capable of executing instructions for performing the exemplary method.

The memory 70 may represent any type of non-transitory computer readable medium such as random access memory (RAM), read only memory (ROM), magnetic disk or tape, optical disk, flash memory, or holographic memory. In one embodiment, the memory 70 comprises a combination of random access memory and read only memory. In some embodiments, the processor 74 and memory 70 may be combined in a single chip. Memory 70 stores instructions for performing the exemplary method as well as the processed data 89, 90.

The network interface 76 allows the computer to communicate with other devices via a computer network, such as a local area network (LAN) or wide area network (WAN), or the internet, and may comprise a modulator/demodulator (MODEM) a router, a cable, and and/or Ethernet port.

The digital processor 74 can be variously embodied, such as by a single-core processor, a dual-core processor (or more generally by a multiple-core processor), a digital processor and cooperating math coprocessor, a digital controller, or the like. The digital processor 74, in addition to controlling the operation of the computer 22, executes instructions stored in memory 70 for performing the method outlined in FIGS. 8 and 9.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

As will be appreciated, FIG. 2 is a high level functional block diagram of only a portion of the components which are incorporated into a computer system 20. Since the configuration and operation of programmable computers are well known, they will not be described further.

Figure 8:
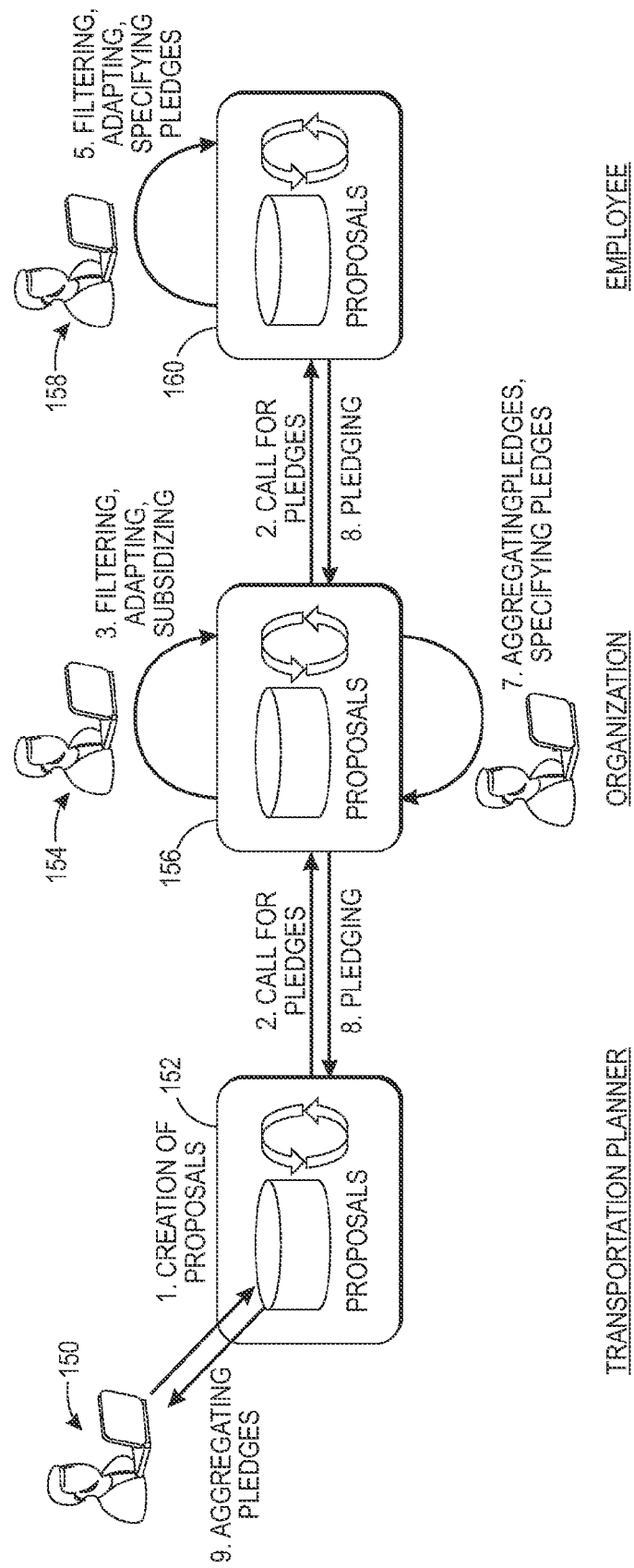
FIG. 8 illustrates an overview of a method for adaptive planning in a transportation network.
Figure 9A:
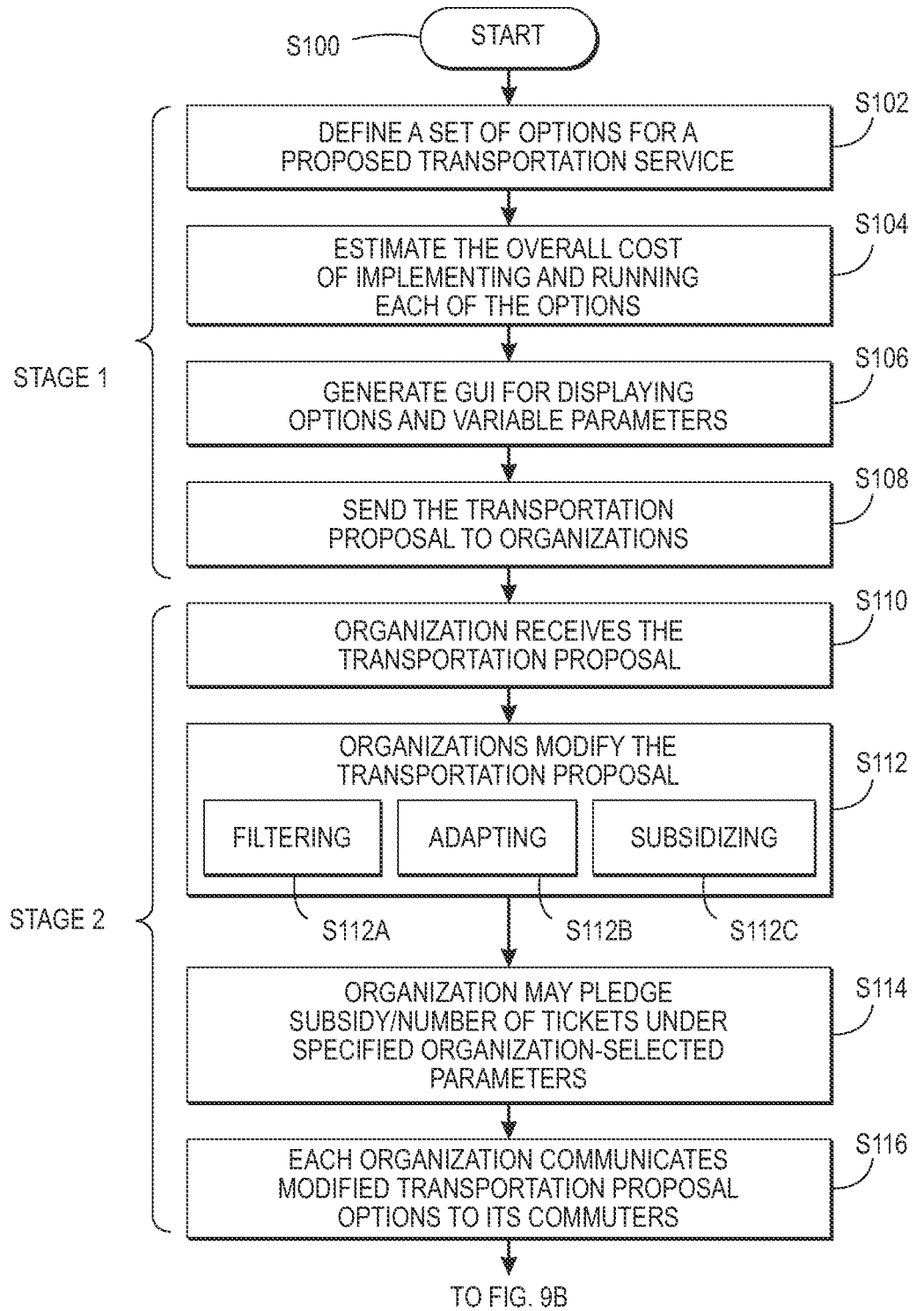
FIGS. 9A and 9B, illustrates one embodiment of the method for adaptive planning of FIG. 8.
Figure 9B:
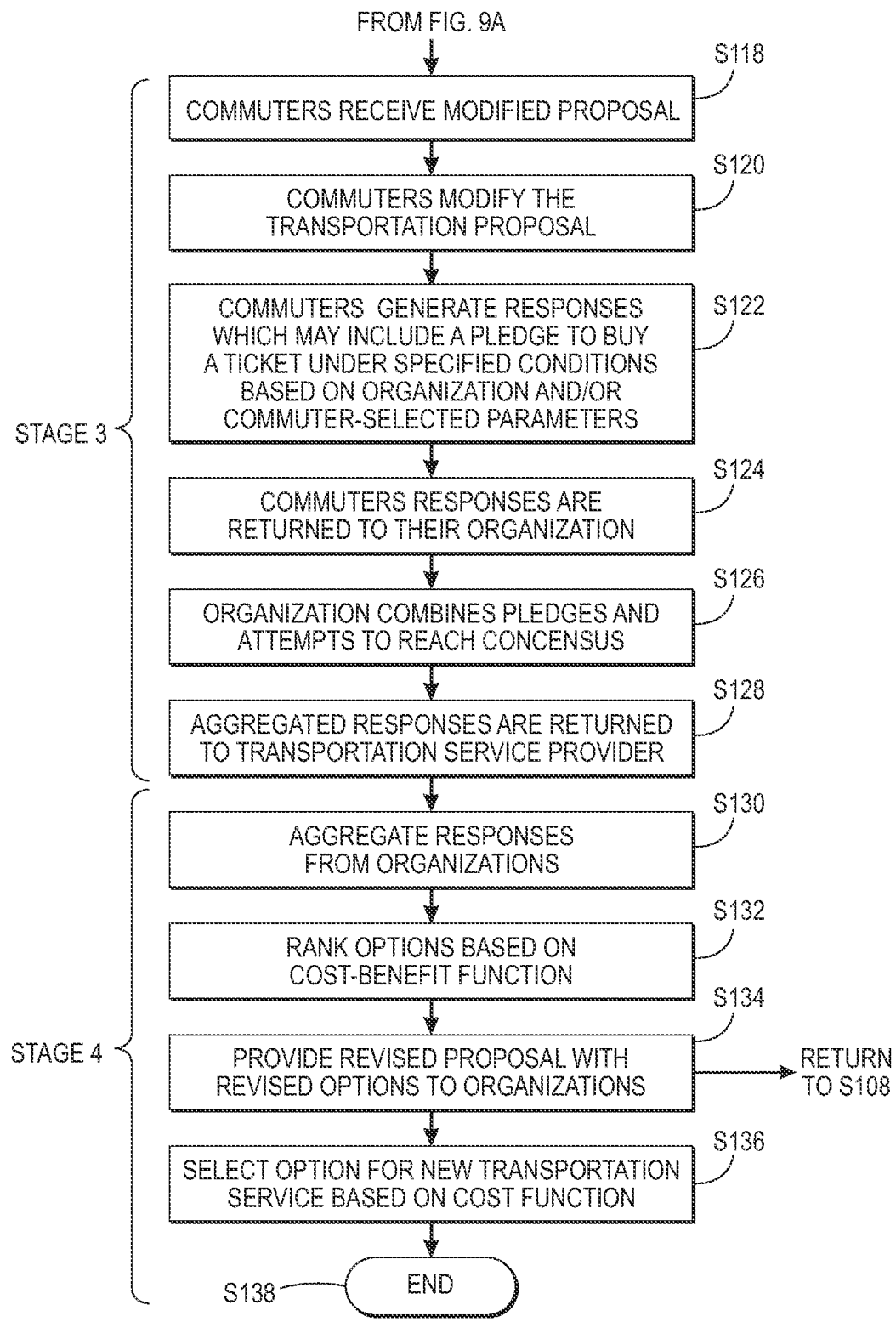

With reference now to FIGS. 8 and 9, a method for adaptive planning of a transportation service is illustrated. FIG. 8 provides an overview of the method, while FIG. 9 provides a more detailed flow chart of one example embodiment of the method. The method begins at S100.

The method may include the following stages.

Stage 1: Creation of Proposal

At S102, the transport provider, e.g., one or more of its employees or contractors 150, defines a closed set 152 of initial options (alternatives) for a new transportation service. The exemplary options are for one or more new bus lines. The initial options may each be defined in terms of a proposed route, stop locations, and frequency, optionally with a timetable. Parts of the route and/or stops may be left open for specification by the organizations. User-definable parameters are also specified. Users may be permitted to define additional parameters and constraints in free text format.

At S104, the transport provider 150 estimates the overall cost of implementing and running each of these initial options based on its knowledge on existing lines and defines a maximum price for the corresponding tickets based on an initial estimate of the number of tickets (expressed in terms of daily or yearly passes, for example) that will be purchased. The overall cost may include costs such as a cost of adding a new driver or reduced benefits due to intersecting existing lines (taking users off those lines). The transport provider 150 may utilize the cost estimator 80 to estimate the overall cost.

At S106, a user interface 92 is generated for displaying the proposal to interested parties, such as organizations A, B, C.

At S108, the transport provider sends the transportation proposal 34 including the resulting set of options to one or more organizations, soliciting pledges from these organizations. The organizations solicited may include those that are current members of a Sustainable Commuting Club, or that are prospective members (e.g., because they are located proximate to the route of one or more of the proposed options). The transport provider requests that each organization and its commuters define their preferred options and pledge tickets or passes for those options.

Stage 2: Refining Options

At S110, one or more organizations receive the transportation proposal 34. The proposal may be displayed in the GUI 92 on the respective display device 52, 54, 56.

At S112, a representative 154 for each contacted organization may review and modify the set of initial options for the proposed transportation service via the graphical user interface, as follows:

S112a. Filtering: If there is more than one proposal, each organization selects the proposal(s) in which it is interested (if any) and the options of interest in those selected proposals. For example, if a proposal contains a set of options with alternative routes having different stops, the organization may decide to consider only those options that contain a stop that is sufficiently close to the organization.

S112b. Adapting: The organization may refine a proposal: for example, if the stop locations are not fully specified by the transport provider, the organization may request an acceptable stop location (e.g., requesting to have a stop located within a threshold distance, which may be specified in terms of distance or time, such as N minutes walking distance or M meters. To check the walking distance and visualize it on the display, the system may rely on a mapping tool, such as Google Maps, which computes an estimate of walking distance using local streets).

S112c. Subsidizing: To each resulting option, the organization may then add incentives for its employees, specifying a subsidy that the organization will contribute for each subscribing employee.

At S114, having selected relevant options, the organization makes a commitment such as a pledge to buy a certain amount of tickets, such as a number of tickets or yearly passes. In another embodiment, the organization may commit to a subsidy, a specified percentage (e.g., 60%) of the price of tickets or yearly passes bought by its employees.

The organization's pledging may be based on the proximity of the proposed option's route and the location of the organization itself, its workers' home locations, and any relevant other locations that the organization would like to be connected to (e.g., transportation hubs, such as the airport, the train station, or other hubs). For each option proposed by the transport provider, the organization can pledge to buy tickets or yearly passes, ignore it, or comment on it. When the organization makes a pledge, it may specify: (a) the number of tickets, e.g., as individual tickets or yearly passes for the coming year, (b) the conditions to be satisfied for the pledging to apply, choosing from a bounded set of parameters already present in the system, and (c), when considered appropriate, provide comments on missing parameters that would enable the organization to express its conditions better. For some options, the organization might simply comment on "missing" parameters without pledging (see, for example, FIG. 7).

At S116, the organization sends the resulting proposals to its commuting employees 158 calling for pledges for the resulting list of modified options 156 and may also feed its decisions back also to the transport provider. The organization may filter and forward particular proposals only to employees that will be concerned by the corresponding line, e.g. living on the corresponding route.

Stage 3: Commuter Input

At S118, the commuters 158 at the organization receive the resulting list of options 156. At S120, the commuters in turn prioritize and refine the proposed options with their personal conditions following a similar procedure to that followed by the organization in S112. Specifically, they may review and further modify the proposed set of modified options via the graphical user interface. They may express conditions about stop locations, connection frequency, maximum total travel duration between two points, etc. (see FIG. 1). Similarly to the organizations, commuters may also propose new options that can be shared across the workforce within the organization. The commuters, in addition to ranking the options and expressing conditions, may also may weight the value of the conditions expressed. As part of this process, the employee may filter the proposals: each employee chooses the proposal(s) he is interested in, if any; and adapts the proposals: the employee refines the selected option(s), if appropriate, with further requirements (e.g., concerning the minimum frequency at which he would be willing to take the new bus line). Therefore he may (i) select among a set of proposed parameters and corresponding values or (ii) and/or specify additional parameters, desires or constraints in free text format to generate an option.

Then, at S122, the commuters commit to particular options, i.e., pledge money for a corresponding pass, if the selected proposals are implemented under their specified conditions. The employee may decide to pledge and commit to buy a pass or a number of tickets for the corresponding line if the formal constraints specified in (i) are satisfied. If a commuter does not want to pledge unless his additional parameters are taken into account, he signals interest without pledging, allowing the organization and, in turn, the transport provider to learn about additional variables that commuters consider relevant and want to specify. The resulting list of options and pledges is fed back to the organization at S124.

At S126, the system, e.g., through an application running on the organization's computer 26, 28, 30, combines the pledges received from the employees and attempts to reach a consensus on a more limited set of the options that are more likely to reach a critical mass at which the cost-benefit function indicates the option is viable. For example, the system generates a set of alternative options (based on the selected parameters) with the corresponding amount of corresponding pledges, and visualizes the results on the graphical interface (e.g., using color codes and thickness of lines to highlight the support received from the employees). The interface may further provide a functionality that combines options (and corresponding pledges) that are close to each other and therefore represent alternatives where a consensus among the various pledging employees might be reachable. In this case, the organization may go back to the corresponding employees (e.g., returning to S118) and try to reach a specification of an option that is acceptable to all of them.

The organization may augment some of the resulting options with an additional amount, corresponding, for example, to tickets it is willing to buy, e.g., for regular visitors. Similar to the employees, the organization may also specify free text comments to provide additional feedback to the transport provider.

The organization then sends the resulting aggregated set of pledges to the transport provider/system 20 at S128.

Stage 4: Cost Analysis for Options

The transport provider combines the pledges from the different organizations similar to the aggregating performed by the organizations. It evaluates them to select the ones with the best cost-benefit balance. For example, at S130, pledges and parameter specifications are aggregated from both the organizations and the commuters by the pledge processing component 56. The transportation service provider can then identify the key parameters and use them to define the L* optimization function that will help to identify which of a set of revised options should be implemented. The cost is calculated based on the location and the number of stops, and the frequency required, benefits are calculated based on the corresponding pledges which cover the combination of the variable parameters for that revised option.

The additional parameters expressed in the comments entry may be extracted from the comments text manually (optionally, also with the support of Natural Language Processing techniques that analyze the comments from all the commuters).

The transport provider then selects the revised option(s) that it will implement and notifies the participating organizations and employees. If no option receives sufficient support, the transport provider may modify its proposals taking into account the feedback collected and re-iterate the process.

For example, at S132, the revised options are ranked based on a cost-benefit function which takes into account the pledges of the organizations and/or commuters. At this stage, there may be a large number of options considered, each one having a respective set of parameters selected by an organization and/or one or more commuters. Specifically, the exemplary cost function takes into account:

1. $typ_s$: the total value of the pledges for each of a set of revised options, where each option has a different combination of parameter values (or ranges of the parameter values) and the pledge value is the value of all pledges which cover that revised option (some pledges may cover more than one revised option),
2. $tyc_s$: the cost of the revised option to the transport provider, which is a function of the parameter values/ranges for that option, and optionally,
3. $uyb_s$: the benefits to the transport provider, which is also a function of the parameter values/ranges for that revised option.

These three costs may all be annualized or computed over another predefined time period. Each of these three costs may then be aggregated (e.g., summed) in the cost function. Other factors may be considered in the ranking such as the number of pledges.

One or more refined options may be selected for further consideration. For example, at S134, the top ranked option(s) may be sent back to the organizations, optionally with additional/modified parameters identified from the comments, for further review, as for the initial review. For example, in the case where too few pledges are received, the city may consider refining the options based on the feedback collected and re-iterate the pledging process. After one or more iterations, a selection of one of the refined options for the new bus line (S136) is performed, again using the cost function.

The method ends at S138.

A generic algorithm for ranking options (S132) is shown in Algorithm 1 below. For illustration, it is assumed the cost function for identifying the optimal option, L*(new line option) is as described in Eqn. 4.

---

Algorithm 1

---

For each of the proposals considered for new bus lines
{
  A. Instantiate parameters of the optimization function L*(new line option)
    with the data collected for:
    a. The start-up costs $c_0$ and operating costs per unit of length c, depending on the parameter values selected by the pledgers, over 1 year (TotalYearly Cost, $tyc_s$).
        $tyc_s = (c_0 + Lc)$
      where L is the number of units covered by the proposal.
    b. The estimated benefits for the pledgers quantified in terms of the pledges (number of tickets and number of passes) which are valid over 1 year and depend on the parameters and parameter values selected by the pledgers: commuters' yearly benefit ($CYB_X$) and all organizations' yearly benefit ($OYB_X$).
        $typ_s = CYB_X + OYB_X$
    This computation includes:
    i. Recording the pledges in vectors for the commuters CYB [ ] and the organizations OYB [ ]. The cardinality of these two vectors corresponds to the number of pledges respectively by commuters and organizations. Data on both the pledge and the pledger are recorded in these vectors.
    ii. Optionally, adding new members to the SC club list based on the collected pledges and removing the inactive members (e.g., those who did not pledge in the past m years, with m being a constant).
    iii. Computing a matrix of results arg[ ][ ] based on the pledges from commuters and organizations. As rows, the matrix contains all the possible subsets of (k) parameters among the n parameters presented to the pledgers: thus it may have $\binom{n}{k} = \frac{n!}{(n-k)!k!}$ rows. For each row, or subset of k parameters (constituting a revised option), the columns may include:
    an identifier s for the set
    the name of each parameter k
    the value-range of each parameter k
    the number of pledgers satisfied by this subset (the parameters and the value-ranges)
    the total value of their pledges for 1 year ($typ_s$)
    the total cost for the new line option implemented satisfying this specific subset (s) of k parameters and value-ranges, over 1 year ($tyc_s$)
    a transport provider benefit value ($uyb_s$) (transport provider yearly benefit UYB [ ]), initialized as −1
    a rank value, initialized as −1.

-continued

---
Algorithm 1
--- iv. Computing the estimated benefits for the transport provider ($uyb_s$)
        over 1 year. Since these depend on the specific subset (s) of
        parameters and value-ranges satisfied by the new line option, the
        estimates are added to the results matrix arg[ ][ ] initialized
        above.
  B. L*(new line option) ranks the rows in the matrix of results arg[ ][ ]
    based on the transportation provider's current decision policy. A simple
    policy is to rank based on the value of the cost-benefit function:
    ($-typ_s + tyc_s + uyb_s$). More complex policies can also factor in the
    number of pledgers: i.e., if at least a predefined proportion (e.g., at least
        80%) of the yearly cost ($tyc_s$) is offset by the pledges ($typ_s$) for at least
        one of the options, then the rank is based on the number of the pledges
        for each option.
  C. L*(new line option) returns the matrix of results arg[ ][ ] as output for
    the given new line option.
}

Finally, the transport provider or system 20 compares the matrices returned by L*(new line option) for each new line proposal and identifies the best revised option (subset of k parameters), e.g., based on the cost benefit function ($-typ_s+tyc_s+uyb_s$) value in the row ranked at the top (alternatively, the system could consider the top r rows, with r being a constant, such as up to 3, 5 or 10). Additional factors may also be considered in the ranking. One of the identified option(s) may then be implemented and at least some of the extra benefits gained by the transport provider may be used to provide rewards (bonus tickets, coupons) to those commuters and/or organizations that had pledged for the option selected and implemented.

As an example of the parameters used to compute the total yearly cost, a new line frequency of f may require b buses and drivers to satisfy n pledges, which affect the cost. As another example, adding more stops, while reducing the walking distance for the users of those stops, makes the bus line longer (at least in terms of time) and may thus require more buses and drivers for the same frequency.

Two types of incentives may be provided to motivate the pledgers to reach the critical mass at which an option is viable:

1. SC Club membership: this provides financial or other incentives from the transport provider to the pledgers. For example, discounts are offered by the transport provider to those who pledge at least every m years, irrespective of whether they pledged for an option which was finally selected. This motivates commuters and organizations to pledge. For example, organizations that pledged for at least one bus line option in the last 5 years may be given a 10% reduction in ticket prices applicable to all commuters in that organization. Thus, in step A(b)(ii) of the algorithm, the identification of members of the club can be used to compute the costs to the transport provider of providing these incentives in the cost-benefit function.

2. Additional financial incentives, such as discounts, may also be offered to those that pledged for the option that is ultimately selected and implemented. This motivates organizations and commuters to pledge for cost-effective options (including the parameters and their associated values) which helps to achieve critical mass. The current status of pledging (e.g., based on a total number of passes pledged for across the city) for each of a set of options may be made publicly available, e.g., through the transport provider's website, to encourage commuters and organizations to pledge for options which are more likely to reach critical mass. The cost of providing these incentives may be incorporated into the cost function.

Stage 5 (Optional)

In the following year, when starting a new cycle for planning a new line (stages 1-4), the transport provider may add additional parameters frequently used in the comments to the proposed parameter list for the next call for pledges.

As more general applications of this method and system, the method can be extended to inform decisions by the transport provider (e.g., the city of Urbis) beyond the planning of new bus lines, such as new tram or metro lines, or hybrid options for sustainable commuting such as park-and-ride arrangements in which riders may carpool for part of their commute and/or drive to a stop on the transportation network where parking is provided.

In the exemplary system and method, the organizations have several roles. In particular, organizations constitute the link between the transport provider and their employees. They endorse the transport provider's proposals and motivate their employees to participate in the overall process, thus facilitating reaching a critical mass. Organizations also know their employees much better than the transport provider. They are thus able to adapt the transport provider's proposals to the needs of their employees. Later in the process, the organization can also help to reach a compromise or consensus between close alternatives. Organizations also guarantee the investment of their employees. Given the employer-employee relationship, both, employer and employees have an obligation to comply with their commitments, which may be made legally binding, e.g., through employment contracts, or simply encouraged through rewards and the like. There may be cases where it is acceptable to cancel a pledge that becomes irrelevant due to a change in the environment, e.g., if an employee leaves the organization. The system may keep track of the canceled pledges across the various organizations/employees to measure their reliability, and take the proportion of cancellations into account when evaluating their pledges in subsequent rounds.

The exemplary system thus facilitates a collaborative process between the three actors: transport provider, organizations, and employees, which encourages participants to work towards achieving a compromise that is acceptable for all rather than seeking to maximize only individual goals.

The method illustrated in FIGS. 8 and 9 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use. The computer program product may be integral with the computer 22, (for example, an internal hard drive of RAM), or may be separate (for example, an external hard drive operatively connected with the computer 22), or may be separate and accessed via a digital data network such as a local area network (LAN) or the Internet (for example, as a redundant array of inexpensive of independent disks (RAID or other network server storage that is indirectly accessed by the computer 22, via a digital network).

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 9, can be used to implement a portion of method. As will be appreciated, while the steps of the method may all be computer implemented, in some embodiments one or more of the steps may be at least partially performed manually.

As will be appreciated, the steps of the method need not all proceed in the order illustrated and fewer, more, or different steps may be performed.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A computer-implemented method for adaptive planning of a transportation service comprising:
   sending a transportation proposal to a plurality of organizations, the proposal including a set of initial options, each initial option including a set of variable parameters for specifying a transportation service;
   with a computer processor, providing a graphical user interface for each organization to select values for one or more of the variable parameters to generate at least one modified option, and for making a commitment for at least one of the modified options, conditional on the organization-selected values for the variable parameters;
   providing for each organization to send respective modified options to commuters of that organization and visualizing pledges received from the commuters for each of the modified options on a graphical interface;
   receiving responses to the modified transportation proposal, at least some of the responses including pledges by the commuters for at least one of the modified options based on the organization-selected values for the variable parameters and, where selected, on commuter-selected values for the variable parameters;
   with a computer processor, computing a cost-benefit function for each of a set of revised options for the transportation service, each of the revised options being based on a combination of the variable parameters for which pledges which cover the combination have been received, the computing the cost benefit function comprising computing for each of the set of revised options for a predetermined time period, a function of:
      a total value of the pledges for that revised option, where each revised option has a different combination of parameter values or ranges of the parameter values,
      a cost of the revised option to the transport provider, which is a function of the parameter values or ranges for that revised option, and
      a benefit to the transport provider; and
   with a computer processor, outputting at least one of the revised options based on the cost-benefit function to a graphical user interface displayed on a display device.

2. The method of claim 1, wherein the cost-benefit function takes into account a cost of providing a respective one of the revised options and the pledges which cover the combination of the variable parameters for that revised option.

3. The method of claim 1, wherein the providing for each organization to modify the transportation proposal comprises generating a user interface through which an organization pledges a subsidy for an initial option or a revised option.

4. The method of claim 1, wherein the providing for each organization to select values for one or more of the variable parameters to generate a modified option comprises providing for the organization to make a commitment for a modified option if at least one condition is satisfied, each of the at least one conditions being based on a value of at least one of the variable parameters.

5. The method of claim 1, wherein the commitment includes at least one of:
   a pledge for purchase of a number of tickets by at least one of the organization and its commuters; and
   a subsidy to the commuters of the organization who pledge for the modified option.

6. The method of claim 1, wherein the transportation proposal is for a new bus line.

7. The method of claim 1, wherein the variable parameters include variable parameters selected from the group consisting of:
   a route;
   a number of stops;
   a location of one of the stops;
   a distance to one of the stops;
   a frequency of the transportation service; and
   a cost of tickets.

8. The method of claim 1, further comprising providing for at least one of the organizations and the commuters to provide comments on missing parameters that would enable the organization or commuter to express a condition on its commitment better.

9. The method of claim 1, further comprising generating a user interface for the organization which identifies revised options for which the cost-benefit function indicates the revised option is closer to being cost effective.

10. The method of claim 1, further comprising identifying members of a sustainable commuting club comprising organizations that have pledged for prior transportation proposals and wherein the transportation proposal provides for lower ticket price for commuters of members of the sustainable commuting club than for commuters of other organizations.

11. The method of claim 1, further comprising ranking the revised options based on the computed cost-benefit function and the outputting includes outputting at least one of the more highly ranked revised options.

12. The method of claim 11, wherein the computing a cost-benefit function includes determining whether at least a predefined proportion of the cost for the predetermined time period is offset by the total value of the pledges for that revised option, and if so, basing the ranking on a number of the pledges for each revised option.

13. A computer program product comprising a non-transitory storage medium storing instructions which, when executed by a computer, perform the method of claim 1.

14. A system comprising memory which stores instructions for performing the method of claim 1 and a processor in communication with the memory for executing the instructions.

15. A computer-implemented system for adaptive planning of a transportation service comprising:

a cost estimator for estimating a cost for each of an initial set of options, each initial option including a set of variable parameters for specifying a transportation service;

a parameter component which stores selectable parameters associated with each initial option, and values of the selectable parameters selected by organizations in generating modified options;

a user interface generator which generates:
  a first user interface for organizations to make a commitment for at least one of the modified options, based on the organization-selected values for the variable parameters, and
  a second user interface for commuters of the organizations to make a commitment for at least one of the modified options, based on the organization-selected values and on one or more user-specified values for the variable parameters;

a pledge processing component which aggregates responses to the modified transportation proposal received from the organizations, at least some of the responses including pledges by the commuters for at least one of the modified options based on the organization-selected values for the variable parameters and on any commuter-selected values for the variable parameters;

a cost-benefit computation component which computes a cost-benefit function for each of a set of revised options for the transportation service, each of the revised options being based on a combination of the variable parameters;

an option update component which identifies at least one of the revised options based on the computed cost-benefit function;

a graphical user interface which displays the identified at least one of the revised options; and a processor which implements the cost estimator, parameter component, user interface generator, pledge processing component, cost-benefit computation component, and option update component.

16. A computer-implemented method for adaptive planning of a transportation service comprising:

sending a transportation proposal to a plurality of organizations, the proposal including a set of variable parameters for specifying an option for a transportation service;

generating a first graphical user interface for each of the organizations to pledge a number of tickets for the transportation service and to select conditions for the organization's pledge, based on selected values for one or more of the variable parameters;

generating a second graphical user interface for commuters of each organization to pledge to purchase a ticket for the transportation service and to select conditions for the commuter's pledge, based on selected values for one or more of the variable parameters, the conditions for the commuter's pledge being constrained by the conditions for the organization's pledge;

receiving the pledges made by the organizations and the commuters; and with a computer processor, computing a cost-benefit function for each of a set of combinations of the selectable parameters for the transportation service, the cost-benefit function taking into account those of the organization pledges and commuter pledges which cover the respective combination; and providing for identifying a revised option for the transportation service based on the computed cost-benefit function for one of the combinations and displaying the identified revised option in a graphical user interface.

17. A computer program product comprising a non-transitory storage medium storing instructions which, when executed by a computer, perform the method of claim 16.

18. A system comprising memory which stores instructions for performing the method of claim 16 and a processor in communication with the memory for executing the instructions.

* * * * *